(12) United States Patent
Fukano et al.

(10) Patent No.: US 7,445,193 B2
(45) Date of Patent: Nov. 4, 2008

(54) SOLENOID-OPERATED VALVE

(75) Inventors: Yoshihiro Fukano, Moriya (JP); Noriya Sasaki, Kasukabe (JP); Masato Hosoi, Kitasoma-gun (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/186,875

(22) Filed: Jul. 22, 2005

(65) Prior Publication Data

US 2006/0017034 A1 Jan. 26, 2006

(30) Foreign Application Priority Data

Jul. 23, 2004 (JP) ............................. 2004-215946

(51) Int. Cl.
F16K 31/02 (2006.01)
F16F 1/18 (2006.01)

(52) U.S. Cl. .................................. 251/129.16; 267/158

(58) Field of Classification Search ................ 267/158, 267/36.1, 80; 251/64, 129.19, 129.16, 337
See application file for complete search history.

(56) References Cited

U.S. PATENT DOCUMENTS

| 2,461,772 | A | * | 2/1949 | Ray ........................ 251/129.16 |
| 2,631,612 | A | * | 3/1953 | Buescher ........................ 251/85 |
| 3,383,084 | A | * | 5/1968 | Mayfield ........................ 251/75 |
| 4,572,436 | A | * | 2/1986 | Stettner et al. ............... 239/124 |
| 4,732,362 | A |   | 3/1988 | Morioka et al. |
| 4,848,727 | A | * | 7/1989 | Nanbu et al. ............. 251/129.16 |
| 4,909,447 | A | * | 3/1990 | Gallup et al. ............. 239/585.3 |
| 5,143,118 | A | * | 9/1992 | Sule ............................. 137/554 |
| 5,359,161 | A | * | 10/1994 | Leach et al. .................. 218/14 |
| 5,381,966 | A | * | 1/1995 | Gernert, II ................ 239/585.3 |
| 5,449,147 | A | * | 9/1995 | Pace et al. .................... 251/337 |
| 5,503,364 | A | * | 4/1996 | Enomoto et al. ........ 251/129.02 |
| 6,318,408 | B1 |   | 11/2001 | Fukano |
| 6,415,817 | B1 | * | 7/2002 | Krimmer et al. ............. 137/550 |
| 6,776,391 | B1 | * | 8/2004 | Goossens et al. ........ 251/129.15 |
| 6,848,669 | B2 | * | 2/2005 | Makino .................. 251/129.15 |
| 6,925,975 | B2 | * | 8/2005 | Ozawa et al. ............. 123/90.11 |
| 2003/0042456 | A1 | * | 3/2003 | Makino .................. 251/129.16 |
| 2005/0168310 | A1 |   | 8/2005 | Nickel et al. |

FOREIGN PATENT DOCUMENTS

| CN | 1270289 | | 10/2000 |
| DE | 3704504 A1 | | 8/1988 |
| DE | 10016600 A1 | * | 5/2001 |
| DE | 10162754 A1 | | 7/2003 |
| GB | 2 201 232 | | 8/1988 |
| GB | 2201232 A | | 8/1988 |

(Continued)

Primary Examiner—John Rivell
Assistant Examiner—Andrew J Rost
(74) Attorney, Agent, or Firm—Paul A. Guss

(57) ABSTRACT

A valve seat section is formed on a valve body having first and second ports. A plate-like movable iron core is provided so that the movable iron core is capable of being seated on the valve seat section. Springs, which press the movable iron core toward the valve seat section, are provided between the movable iron core and a solenoid section. When the movable iron core is seated on the valve seat section, the movable iron core is pressed toward the valve seat section by the resilient forces of the springs in addition to the pressing force of the pressure fluid.

6 Claims, 7 Drawing Sheets

FOREIGN PATENT DOCUMENTS

| | | |
|---|---|---|
| JP | 45-23070 | 8/1970 |
| JP | 48-21219 | 3/1973 |
| JP | 53-103228 | 9/1978 |
| JP | 56-94079 | 7/1981 |
| JP | 62-113977 | 5/1987 |
| JP | 63-254287 | 10/1988 |
| JP | 7-270670 | 10/1995 |
| JP | 10-281327 | 10/1998 |
| JP | 11-118060 | 4/1999 |
| JP | 11-132352 | 5/1999 |
| JP | 2955520 | 7/1999 |
| JP | 11-304030 | 11/1999 |
| JP | 11-304034 | 11/1999 |
| JP | 2000-46223 | 2/2000 |
| JP | 2003-28334 | 1/2003 |
| JP | 2004-108580 | 4/2004 |
| KR | 10-0304485 | 7/2002 |
| KR | 2002-0078182 | 10/2002 |

* cited by examiner

SOLENOID-OPERATED VALVE

BACKGROUND OF THE INVENTION

1. Field of the Invention

The present invention relates to a solenoid-operated valve which has a movable iron core that is displaceable under a magnetically exciting action of a coil. In particular, the present invention relates to a solenoid-operated valve which makes it possible to improve the response performance when the movable iron core is displaced.

2. Description of the Related Art

A solenoid-operated valve has been hitherto adopted, in which a solenoid (electromagnet) is magnetically excited by applying a current, and a movable iron core is attracted and displaced toward a fixed iron core under the magnetically exciting action thereof so that the valve-open state and the valve-closed state of a valve plug are switched by the movable iron core.

Such a solenoid-operated valve is adopted, for example, for a classifier which selects and removes defectives, impurities and the like from rice grains or tealeaves, for example, which are in transport. In such a situation, the defectives or impurities, which are being transported on a transport passage, are detected by a detection sensor. A detection signal from the detection sensor is supplied to the solenoid-operated valve, and thus the solenoid-operated valve is in the valve-open state. Accordingly, the pressurized air is belched out from the solenoid-operated valve toward the transport passage, and the impurities or the like are removed by the pressurized air. A high speed response performance is required for the solenoid-operated valve so that the pressurized air can be belched out by performing the valve-opening/closing operation at a high speed in response to the detection signal from the detection sensor.

The solenoid-operated valve as described above comprises a solenoid section and a valve section. A plate-like movable iron core is provided displaceably in the axial direction in a valve chamber which is communicated with an input port and an output port. The solenoid section is provided above the movable iron core. The solenoid section includes a coil wound around a coil bobbin arranged substantially perpendicularly to the axis of the solenoid-operated valve. A fixed iron core is inserted and fixed to a central portion of the coil bobbin.

The movable iron core is pressed downwardly by the pressurized air supplied from the input port to give the valve-closed state in which the movable iron core is seated on a valve seat. When the magnetic field is generated between the movable iron core and the fixed iron core under the energization action exerted on the coil in the valve-closed state, the movable iron core is attracted toward the fixed iron core to give the valve-open state in which the movable iron core is separated from the valve seat (see, for example, Japanese Patent No. 2955520).

Generally, in the solenoid-operated valve as described above, there is a need for the displacement speed of the movable iron core in the axial direction, which is obtained when the valve plug is opened/closed, to be further increased in order to reliably remove the impurities or the like transported over the transport passage.

In the conventional technique concerning Japanese Patent No. 2955520, when the solenoid-operated valve is switched to the valve-closed state, then the energization of the coil is stopped, and the movable iron core is displaced in the direction directed to the valve seat so that the movable iron core is seated thereon by the air pressure of the pressurized air supplied from the input port to the valve chamber. In order to obtain the necessary high speed as described above, for example, the air pressure of the pressurized air supplied to the input port may be increased so that the displacement speed of the movable iron core is increased when the valve is closed.

However, the air pressure of the pressurized air essentially allows the pressurized air to flow from the input port to the output port in the valve-open state, and the pressurized air is discharged from the output port to remove the impurities or the like. Therefore, it is difficult to increase the air pressure so that the displacement speed of the movable iron core is increased when the valve is closed by the change of the air pressure, only for the purpose of increasing the displacement speed of the movable iron core.

SUMMARY OF THE INVENTION

A general object of the present invention is to provide a solenoid-operated valve which makes it possible to further improve the response performance of a movable iron core when the valve-open state is switched to the valve-closed state.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
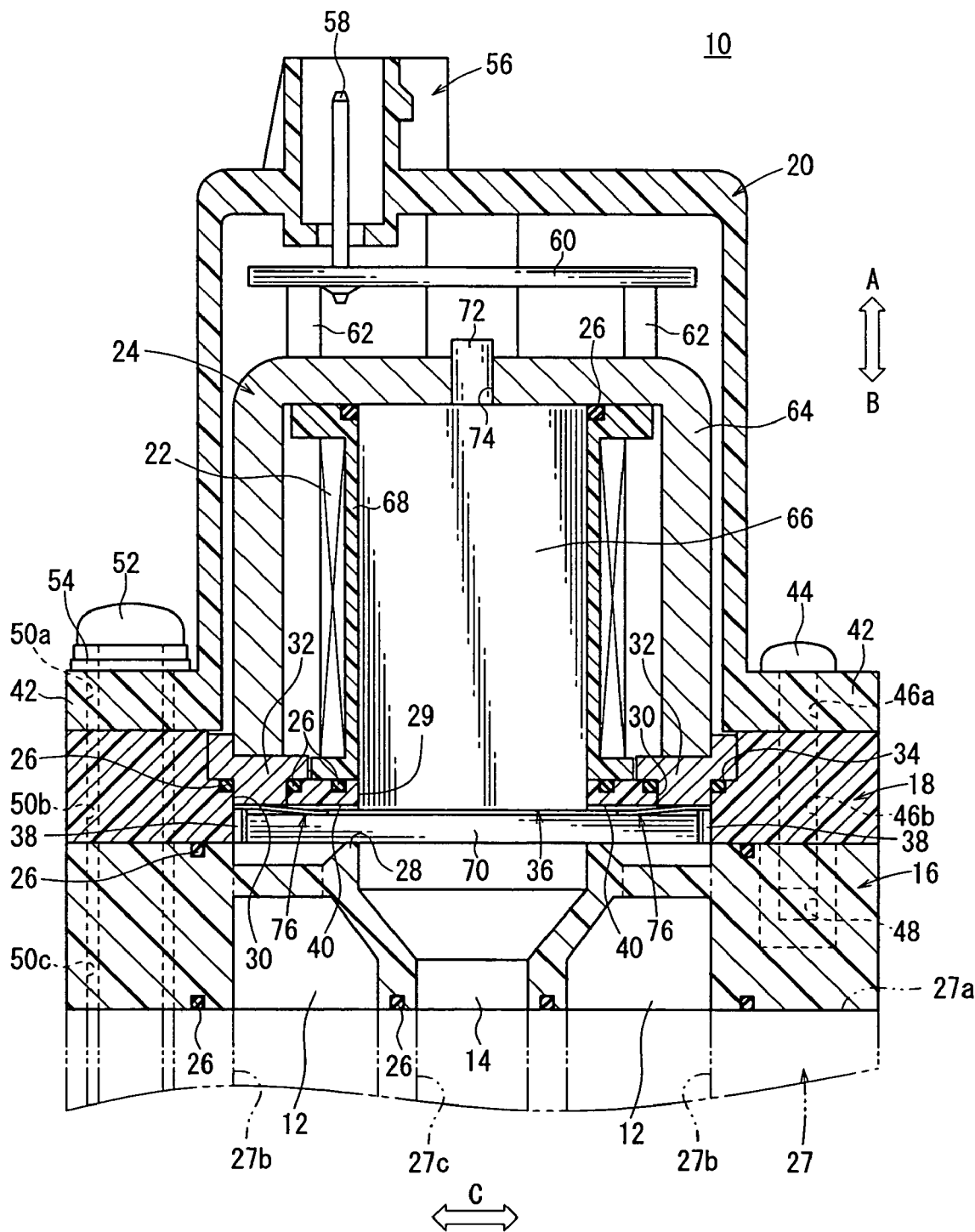
FIG. 1 is a vertical sectional view illustrating a solenoid-operated valve according to a first embodiment of the present invention.

With reference to FIG. 1, reference numeral 10 indicates a solenoid-operated valve according to a first embodiment of the present invention.

As shown in FIG. 1, the solenoid-operated valve 10 comprises a valve body (body) 16 which has first and second ports 12, 14 for supplying and discharging a pressure fluid, a sub-body 18 which is integrally connected to an upper portion of the valve body 16, a casing 20 which is connected to an upper portion of the sub-body 18, and a solenoid section 24 which is provided in the casing 20 and which switches the communication states of the first and second ports 12, 14 under the magnetically exciting action of a coil 22.

The valve body 16 is formed of a resin material and has a substantially rectangular cross section. The first ports 12 are formed on one end surface of the valve body 16, which are connected to an unillustrated pressure fluid supply source to supply the pressure fluid (for example, compressed air). The second port 14, through which the pressure fluid supplied from the first ports 12 is discharged, is formed at a substantially central portion of the valve body 16. The first ports 12 are formed on the both sides of the second port 14 as a center respectively.

A seal member 26 is installed to a recessed groove on one end surface of the valve body 16 to surround the circumference of the second port 14. Further, a seal member 26 is also installed to a recessed groove disposed on the outer circumferential side of the first ports 12 in the same manner as described above. That is, when the valve body 16 of the solenoid-operated valve 10 is installed, for example, onto a flat surface 27a of a manifold 27, then the seal members 26 abut against the flat surface 27a, and air tightness is reliably retained between the manifold 27 and the first and second ports 12, 14 of the valve body 16.

The manifold 27 has first and second passages 27b, 27c which are formed at positions opposed to the first and second ports 12, 14 respectively. The first passage 27b is connected to the unillustrated pressure fluid supply source. The second passage 27c is communicated with a transport passage (not shown) for transporting, for example, rice grains or tealeaves.

A valve seat section 28, which protrudes toward the casing 20 (in the direction of the arrow A) and which makes communication with the second port 14, is formed at a substantially central portion on the other end side of the valve body 16. The end surface of the valve seat section 28 is formed so that the end surface is substantially flush with the other end surface of the valve body 16. The interior of the valve seat section 28 formed to be cylindrical makes communication with the second port 14.

Meanwhile, the sub-body 18, which is formed of a resin material and has a cylindrical shape, is provided between the valve body 16 and the casing 20. A seal member 26 is provided on the end surface of the valve body 16 which makes abutment against the sub-body 18. Accordingly, air tightness is reliably retained by the seal member 26 in the interiors of the valve body 16 and the sub-body 18.

An insertion hole 29, into which a fixed iron core 66 is inserted, is formed at a substantially central portion of the sub-body 18. Further, a pair of installation holes 30 is formed, and the installation holes 30 are separated by a predetermined distance from the insertion hole 29 as a center. A pair of retaining members 32 is installed to the installation holes 30, and each of the retaining members 32 is composed of a magnetic material. Outer wall portions of the retaining members 32 are engaged with steps 34 formed on the sub-body 18, and inner wall portions thereof are engaged between the installation holes 30 and the insertion hole 29. Accordingly, the retaining members 32 are retained with the sub-body 18 in a state in which portions of the retaining members 32 are inserted into the installation holes 30.

A seal member 26 is installed to a recessed groove on the end surface of the sub-body 18 to make abutment with the step 34 and the retaining member 32. Air tightness is retained in the sub-body 18 by the seal member 26.

Figure 3:
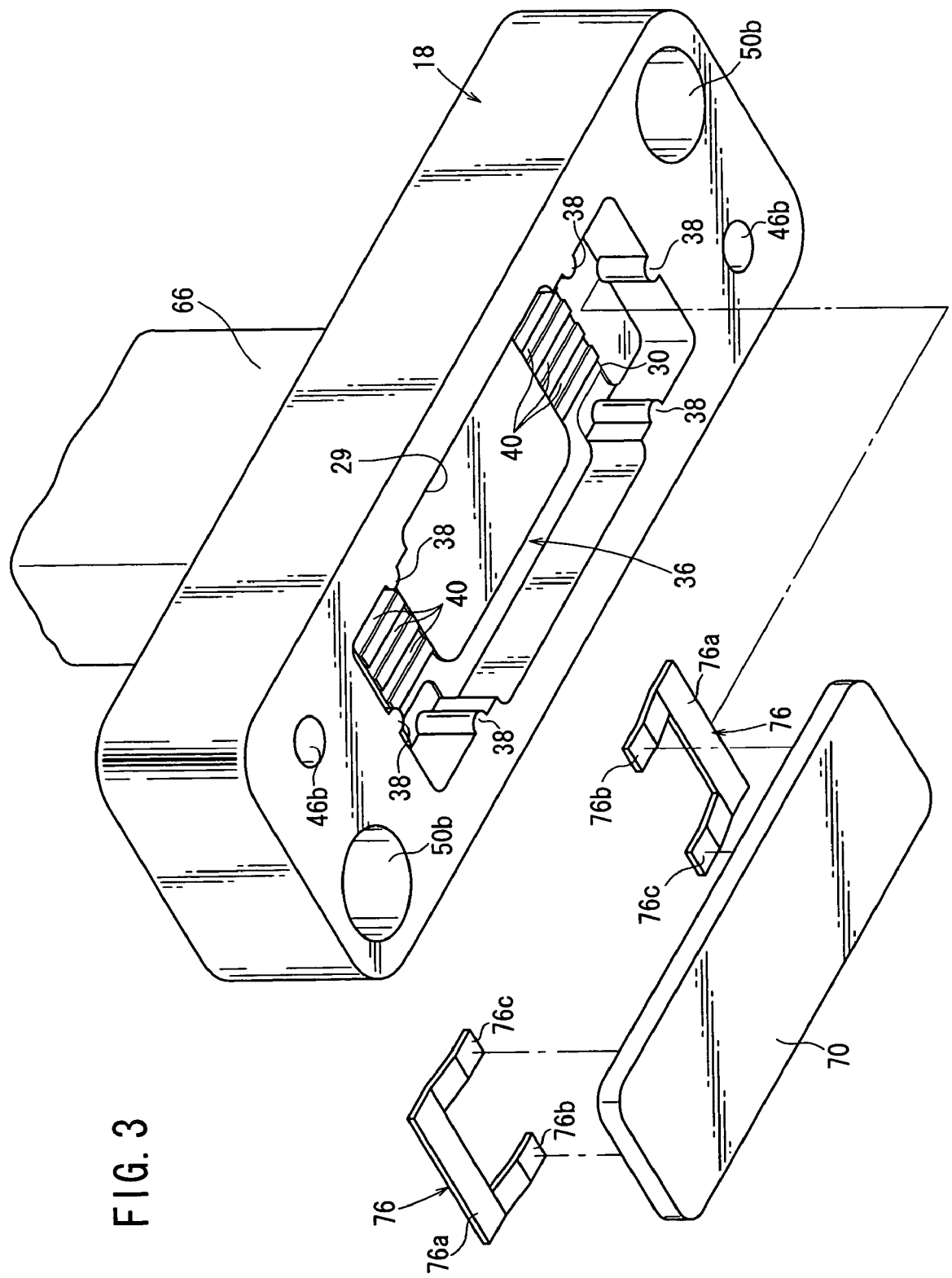
FIG. 3 is, with partial omission, an exploded perspective view illustrating a state in which the movable iron core and springs of the solenoid-operated valve shown in FIG. 1 are disassembled.
Figure 4:
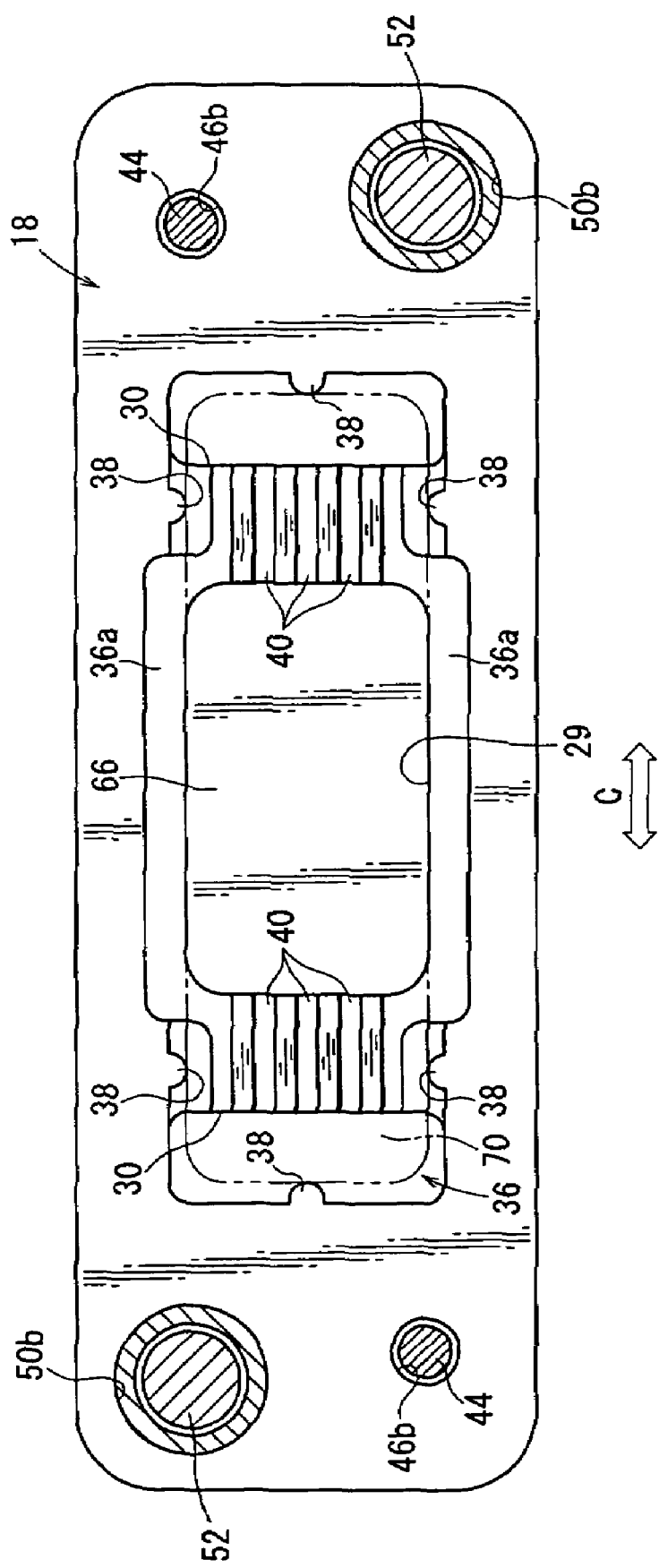
FIG. 4 is a plan view illustrating a state in which a valve body is disengaged from the solenoid-operated valve shown in FIG. 1.

A communication chamber 36, in which the pressure fluid flows in the direction from the insertion hole 29 and the installation holes 30 to the valve body 16 (in the direction of the arrow B), is formed in the sub-body 18. The communication chamber 36 is surrounded by the end surface of the valve body 16 disposed on the side of the sub-body 18 (in the direction of the arrow A), the inner wall surface of the sub-body 18, and the retaining members 32. When the first ports 12 and the second port 14 are communicated with each other, the pressure fluid is introduced into the communication chamber 36. As shown in FIGS. 3 and 4, a plurality of (for example, six) projections 38, which protrude toward the insertion hole 29 of the sub-body 18 to face the communication chamber 36, are formed on the inner wall surface of the sub-body 18 while being separated from each other by predetermined distances.

As shown in FIG. 4, the projections 38 are provided on the inner wall surface of the sub-body 18 facing the installation hole 30 respectively, and the projections 38 are provided on the inner wall surface between the installation holes 30 and the insertion hole 29 respectively. That is, the projections 38 are provided at substantially symmetrical positions about the insertion hole 29. Further, the projections 38 are arranged so that they are opposed to each other. The projections 38 are formed so that the protruding amounts thereof from the inner wall surface are substantially equivalent respectively.

A plurality of air grooves 40, each of which is recessed by a predetermined depth, are formed on the end surface of the sub-body 18 opposed to the valve body 16. The air grooves 40 extend in straight lines to make communication between the installation holes 30 and the insertion hole 29 (in the direction of the arrow C in FIG. C). The plurality of (for example, four) air grooves 40 are formed substantially in parallel to one another while being separated from each other by predetermined distances. The pressure fluid, which is supplied from the first ports 12, flows from the communication chamber 36 through the air grooves 40 to the second port 14 (see FIG. 6), because the air grooves 40 are formed to make communication with the communication chamber 36.

As shown in FIG. 1, the casing 20 is formed with a bottom-equipped cylindrical member composed of a resin material. A flange section 42, which is formed on an open end surface side of the casing 20, is connected to the sub-body 18 by a connecting bolt 44. That is, the connecting bolt 44 is inserted into through-holes 46a, 46b of the casing 20 and the sub-body 18, and the connecting bolt 44 is screwed with a screw hole 48 of the valve body 16. Accordingly, the casing 20, the sub-body 18, and the valve body 16 are connected in an integrated manner.

Insertion holes 50a, 50b, 50c, which penetrate in straight lines, are formed through the casing 20, the sub-body 18, and the valve body 16 respectively. The solenoid-operated valve 10 is fixed to the manifold 27 in an integrated manner by a washer 54 and a fixing bolt 52 inserted into the insertion holes 50a to 50c.

A connecting section 56, to which a connector or the like connected to an unillustrated power source is connectable, is formed at an upper portion of the casing 20. The connecting section 56 is connected to a circuit board 60 arranged in the casing 20 via a connecting pin 58. The current, which is supplied from the power source to the connecting section 56, is supplied from the connecting pin 58 to the circuit board 60. The current is supplied to a frame 64 via a connecting member 62 which connects the circuit board 60 and the frame 64.

The solenoid section 24 includes the frame 64 which is open toward the valve body 16 and which has a U-shaped cross section, the fixed iron core 66 which is installed in the frame 64, a cylindrical bobbin 68 which is installed to the circumferential surface of the fixed iron core 66 and around which the coil 22 is wound, and a movable iron core 70 which is provided displaceably in the axial direction between the fixed iron core 66 and the valve body.

The frame 64 is formed of a magnetic material such as a metal material. The frame 64 is arranged so that the open end of the frame 64 abuts against the retaining members 32.

A projection 72, which protrudes at a substantially central portion, is formed at one end of the fixed iron core 66. The projection 72 is inserted into a hole 74 which is formed at a substantially central portion of the frame 64. Accordingly, the displacement in a substantially horizontal direction (in the direction of the arrow C in FIG. 1) of the fixed iron core 66 with respect to the frame 64 is limited. In other words, the frame 64 and the fixed iron core 66 are relatively positioned.

The bobbin 68 has one end which abuts against the inner wall surface of the frame 64 and the other end which abuts against the sub-body 18. Therefore, a state is given, in which the bobbin 68 is interposed between the casing 20 and the sub-body 18.

A seal member 26, which is provided at one end of the bobbin 68, abuts against the frame 64, and the other end of the bobbin 68 abuts against another seal member 26 which is provided on the end surface of the sub-body 18. Accordingly, air tightness is retained for the interior of the bobbin 68.

As shown in FIGS. 3 and 4, the movable iron core 70 is formed of a metal material and has a substantially rectangular plate-like shape. The movable iron core 70 is arranged in the communication chamber 36 of the sub-body 18.

As shown in FIG. 4, the side surfaces of the movable iron core 70 abut against the plurality of projections 38 formed on the sub-body 18 to give a state in which the displacement of the movable iron core 70 in a substantially horizontal direction is limited by the projections 38. In other words, the movable iron core 70 is provided displaceably in only the axial direction of the solenoid-operated valve (in the directions of the arrows A and B shown in FIG. 1). The displacement of the movable iron core 70 in the direction substantially perpendicular to the axis is prohibited. When the plurality of projections 38 are provided as described above, then the movable iron core 70 can be retained more reliably, and it is possible to limit the displacement in the substantially horizontal direction.

Figure 5:
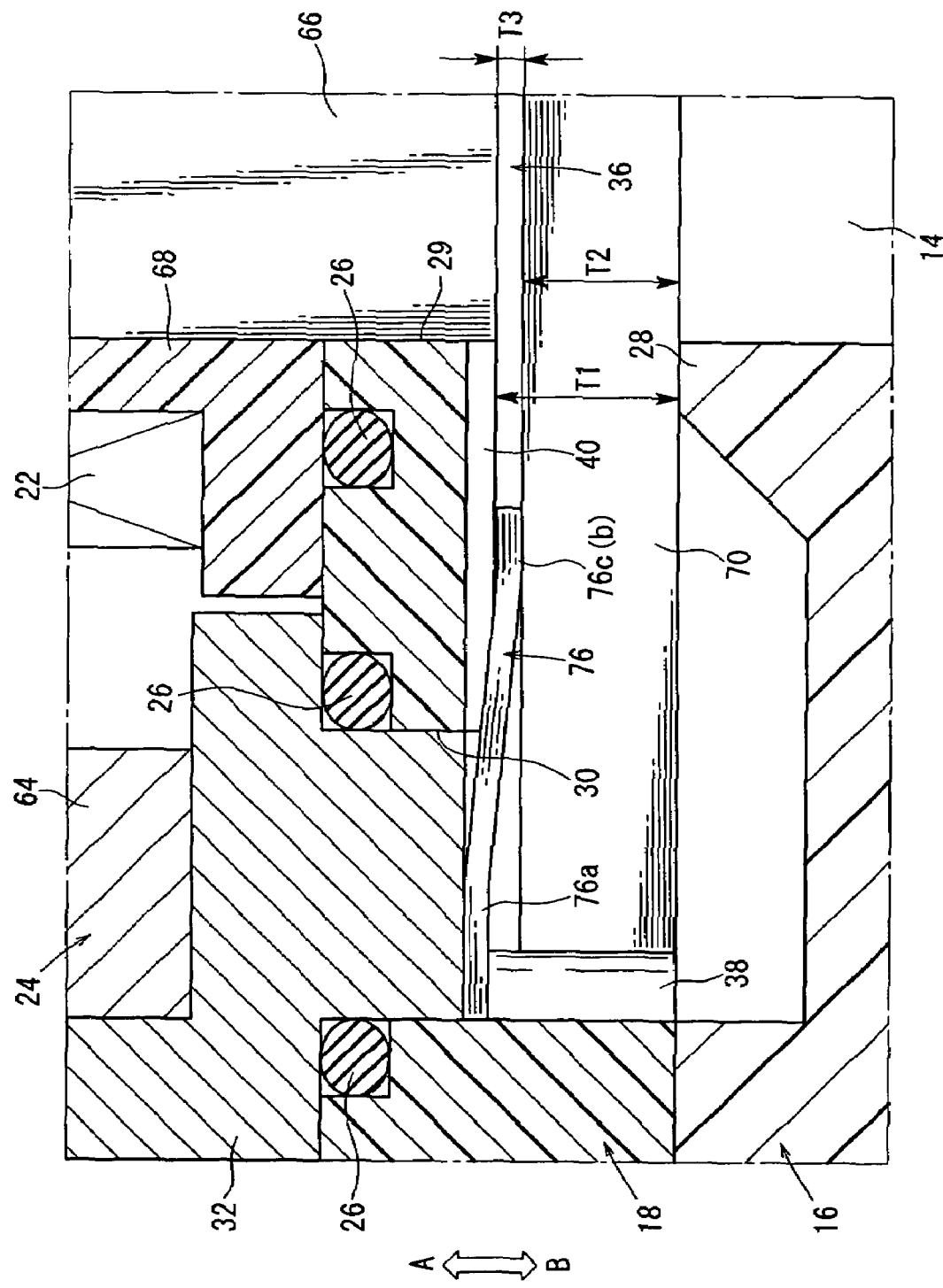
FIG. 5 is a magnified vertical sectional view illustrating the vicinity of the spring of the solenoid-operated valve in the valve-closed state as shown in FIG. 1.
Figure 6:
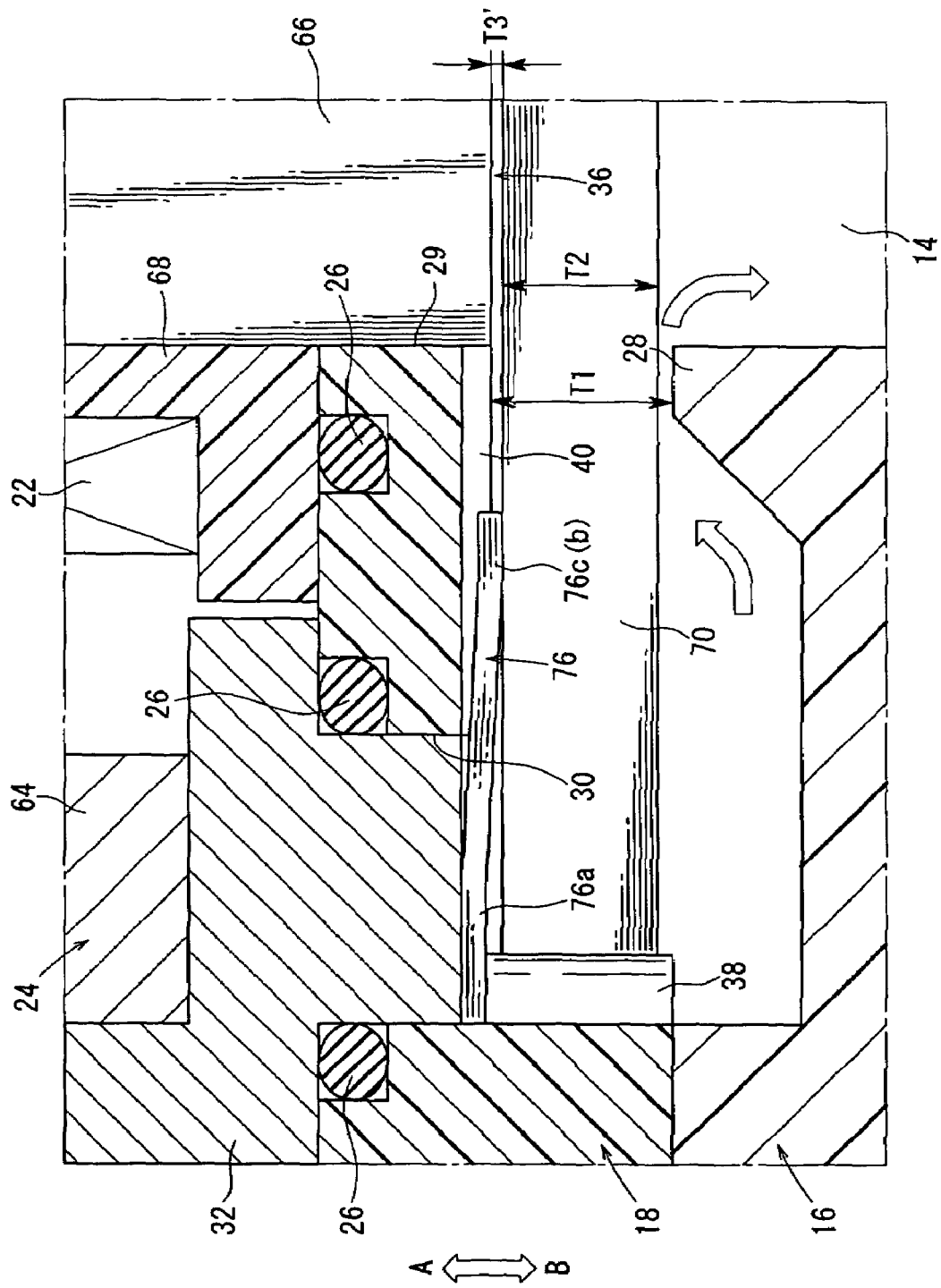
FIG. 6 is a magnified vertical sectional view illustrating the vicinity of the spring of the solenoid-operated valve in the valve-open state as shown in FIG. 2.

As shown in FIGS. 5 and 6, the height dimension T1 of the communication chamber 36 in the axial direction is formed to be slightly larger than the thickness dimension T2 of the movable iron core 70 (T1>T2). That is, when the movable iron core 70 is arranged in the communication chamber 36, and the movable iron core 70 is seated on the valve seat section 28, then a slight clearance T3 (air gap) is formed between the movable iron core 70 and the end surfaces of the sub-body 18 and the retaining members 32 (T3=T1−T2).

Further, as shown in FIG. 4, a gap 36a is formed between the inner wall surface of the communication chamber 36 and the outer circumferential surface of the movable iron core 70. Therefore, the pressure fluid, which is introduced from the first ports 12, is always introduced into the communication chamber 36 via the gap 36a.

Meanwhile, a pair of springs (resilient members) 76 is provided between the movable iron core 70 and the retaining members 32. The springs 76 are separated by a predetermined distance respectively from the insertion hole 29 of the sub-body 18 as a center. Each of the springs 76 is composed of, for example, a plate spring. The movable iron core 70 is urged toward the valve seat section 28 (in the direction of the arrow B) under the resilient action of the springs 76.

As shown in FIG. 3, the spring 76 is formed to have a substantially U-shaped cross section with a plate-like non-magnetic material. A flat section 76a, which is interposed between the retaining member 32 and the sub-body 18, serves as the support point. The spring 76 has a pair of bent sections 76b, 76c, and each of the bent sections 76b, 76c is inclined by a predetermined angle toward the other end to make abutment against the movable iron core 70 (see FIGS. 5 and 6). That is, a state is given, in which the bent sections 76b, 76c of the spring 76 always abut against the end surface of the movable iron core 70.

The valve-closed state is established such that the movable iron core 70 is pressed by the resilient forces of the springs 76, and the movable iron core 70 is seated on the valve seat section 28 as described above. Therefore, the movable iron core 70 functions as a valve plug which switches the valve-open state and the valve-closed state of the solenoid-operated valve 10.

The springs 76 are not limited to the pair of springs 76 formed to have the substantially U-shaped cross sections. The shape and type of the spring 76 are not especially limited provided that the spring 76 has a resilient force to press the movable iron core 70 toward the valve seat section 28, as exemplified, for example, by a rubber member or the like.

The solenoid-operated valve 10 according to the first embodiment of the present invention is basically constructed as described above. Next, its operation, function, and effect will be explained.

FIG. 1 illustrates the non-excited state in which the current is not supplied to the coil 22 via the connecting section 56, and also the valve-closed state in which the movable iron core 70 is seated on the valve seat section 28 by the resilient forces of the springs 76 to block the communication between the first ports 12 and the second port 14. Also in this situation, the pressure fluid, which is supplied from the unillustrated pressure fluid supply source to the first ports 12, is introduced into the communication chamber 36 via the gap 36a between the movable iron core 70 and the inner wall surface of the communication chamber 36.

Figure 2:
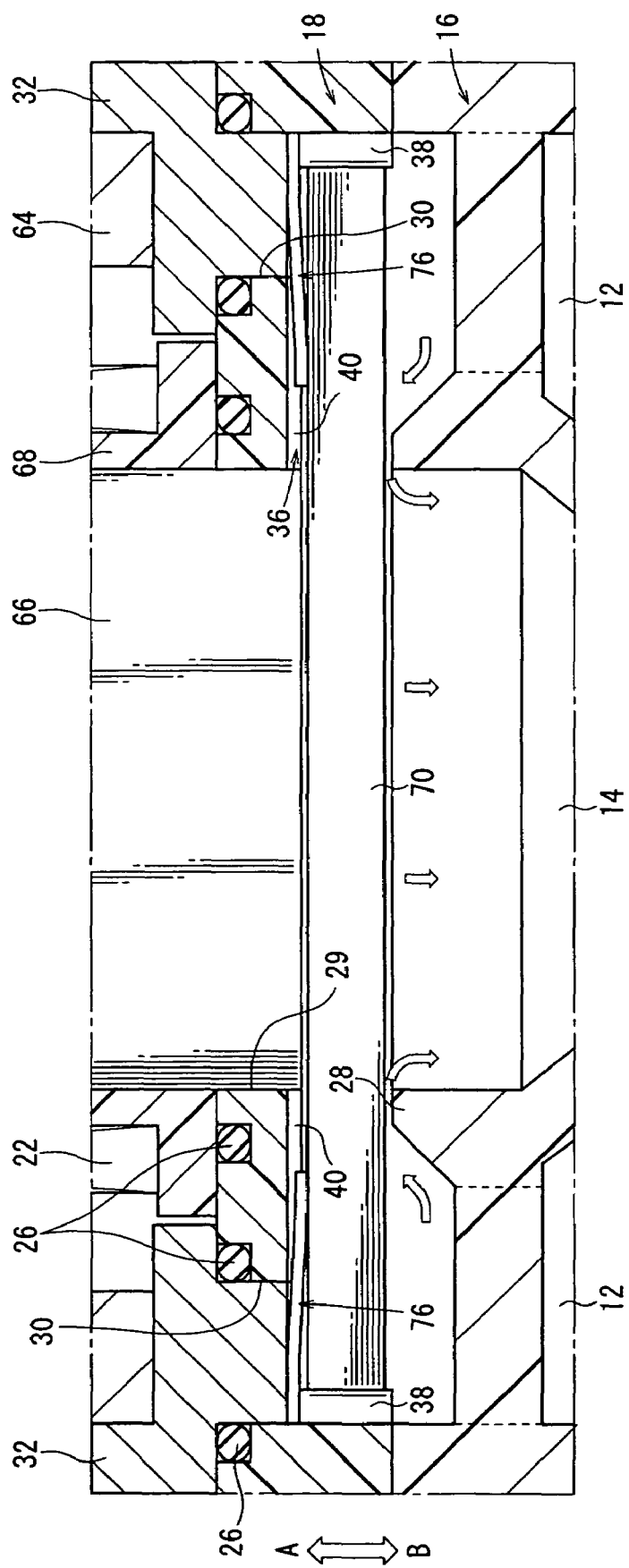
FIG. 2 is a magnified vertical sectional view illustrating the valve-open state in which a movable iron core of the solenoid-operated valve shown in FIG. 1 is separated from a valve seat section.

At first, starting from the valve-closed state as described above, the unillustrated power source is energized to apply the current to the coil 22 via the connecting section 56, and thus the coil 22 is magnetically excited. The movable iron core 70 is attracted toward the fixed iron core 66 (in the direction of the arrow A) under the magnetically exciting action thereof. Accordingly, the movable iron core 70 is displaced by a minute distance toward the fixed iron core 66 (in the direction of the arrow A) against the resilient forces (reaction forces) of the springs 76, and the movable iron core 70 is separated from the valve seat section 28. The solenoid-operated valve 10 is switched from the valve-closed state shown in FIG. 1 to the valve-open state shown in FIG. 2.

After the movable iron core 70 is displaced by the minute distance toward the fixed iron core 66 (in the direction of the arrow A), the displacing force of the movable iron core 70 (attracting force of the fixed iron core 66) is balanced with the resilient forces of the springs 76. Accordingly, the displacement of the movable iron core 70 is stopped. That is, the displacement of the movable iron core 70 is limited by the resilient forces of the springs 76. Therefore, the movable iron core 70 and the fixed iron core 66 do not make contact with each other. In other words, the springs 76 functions as a stopper to limit the displacement of the movable iron core 70 toward the fixed iron core 66 in the axial direction (in the direction of the arrow A).

Similarly, when the movable iron core 70 is displaced toward the fixed iron core 66 (in the direction of the arrow A), the movable iron core 70 does not contact the sub-body 18 and the retaining members 32 as well.

Accordingly, a slight clearance T3', which serves as an air gap, is formed between the movable iron core 70 and the fixed iron core 66 in the communication chamber 36, even in the valve-open state in which the movable iron core 70 is separated from the valve seat section 28. The clearance T3' is smaller than the clearance T3 which is provided in the valve-closed state (T3'<T3) (see FIGS. 5 and 6).

The pressure fluid, which is supplied from the first ports 12 of the solenoid-operated valve 10 in the valve-open state, flows via the communication chamber 36 through the gap 36a between the valve seat section 28 and the movable iron core 70, and the pressure fluid is discharged from the second port 14. Thus, the pressure fluid is supplied to the manifold 27.

Subsequently, when the solenoid-operated valve 10 is allowed to be in the valve-closed state reversely to the above, the current, which has been applied to the coil 22 by the unillustrated power source, is deenergized. Accordingly, the movable iron core 70, which has been attracted toward the fixed iron core 66 (in the direction of the arrow A) under the magnetically exciting action of the coil 22, is pressed in the direction (direction of the arrow B) to make separation from the fixed iron core 66 by the pressing force exerted by the pressure fluid introduced into the communication chamber 36 via the air grooves 40 from the first ports 12 and the additional resilient forces of the springs 76. That is, the movable iron core 70 is pressed so that the movable iron core 70 is seated on the valve seat section 28. When the movable iron core 70 is seated on the valve seat section 28 by the pressing force of the pressure fluid and the resilient forces of the springs 76, the valve-closed state is given, in which the flow of the pressure fluid to the second port 14 is blocked, while the pressure fluid has been supplied from the first ports 12.

In this arrangement, the movable iron core 70 can be displaced at a high speed so that the movable iron core 70 is quickly seated on the valve seat section 28 by the pressing force exerted by the pressure fluid supplied from the first ports 12 into the communication chamber 36 and the resilient forces of the springs 76 directed downwardly.

As described above, in the first embodiment, the resilient forces of the springs 76 provided between the movable iron core 70 and the fixed iron core 66 are urged in addition to the pressing force exerted by the pressure fluid on the movable iron core 70 during the valve-closing operation in which the movable iron core 70 is to be seated on the valve seat section 28. Therefore, the movable iron core 70 can be seated on the valve seat section 28 more quickly as compared with the conventional solenoid-operated valve in which the movable iron core 70 is to be seated on the valve seat section 28 by only the pressing force of the pressure fluid.

Accordingly, the movable iron core 70 can be separated at the high speed under the magnetically exciting action of the coil 22 during the valve-opening operation in which the movable iron core 70 is to be separated from the valve seat section 28, and the movable iron core 70 can be seated at the high speed by the pressing force of the pressure fluid and the resilient forces of the springs 76 during the valve-closing operation. Therefore, it is possible to improve the response performance of the movable iron core 70 during the valve-opening operation and the valve-closing operation of the solenoid-operated valve 10, and especially it is possible to improve the response performance when the solenoid-operated valve 10 is switched from the valve-open state to the valve-closed state.

The springs 76 also function as a stopper to limit the displacement amount of the movable iron core 70 during the valve-opening operation under the resilient action of the springs 76. When the movable iron core 70 is displaced toward the fixed iron core 66 (in the direction of the arrow A), it is possible to avoid contact of the movable iron core 70 with the fixed iron core 66 due to the resilient forces of the springs 76. Therefore, it is possible to avoid the generation of contact sound which would otherwise be generated by the contact between the movable iron core 70 and the fixed iron core 66. It is also unnecessary to provide any fastening mechanism in order to limit the displacement of the movable iron core 70. Further, it is possible to reduce the number of parts and the cost by simplifying the arrangement of the solenoid-operated valve 10.

In other words, the springs 76 have both the function to displace the movable iron core 70 toward the valve seat section 28 during the valve-closing operation under the resilient action thereof, and the stopper function to effect the regulation so that the movable iron core 70 does not make any contact with the fixed iron core 66 during the valve-opening operation.

Further, when the movable iron core 70 is separated from the valve seat section 28, abrasion, which would otherwise be caused by the contact between the movable iron core 70 and the fixed iron core 66, is avoided by the springs 76. Therefore, it is possible to improve the durability of the movable iron core 70 and the fixed iron core 66.

Figure 7:
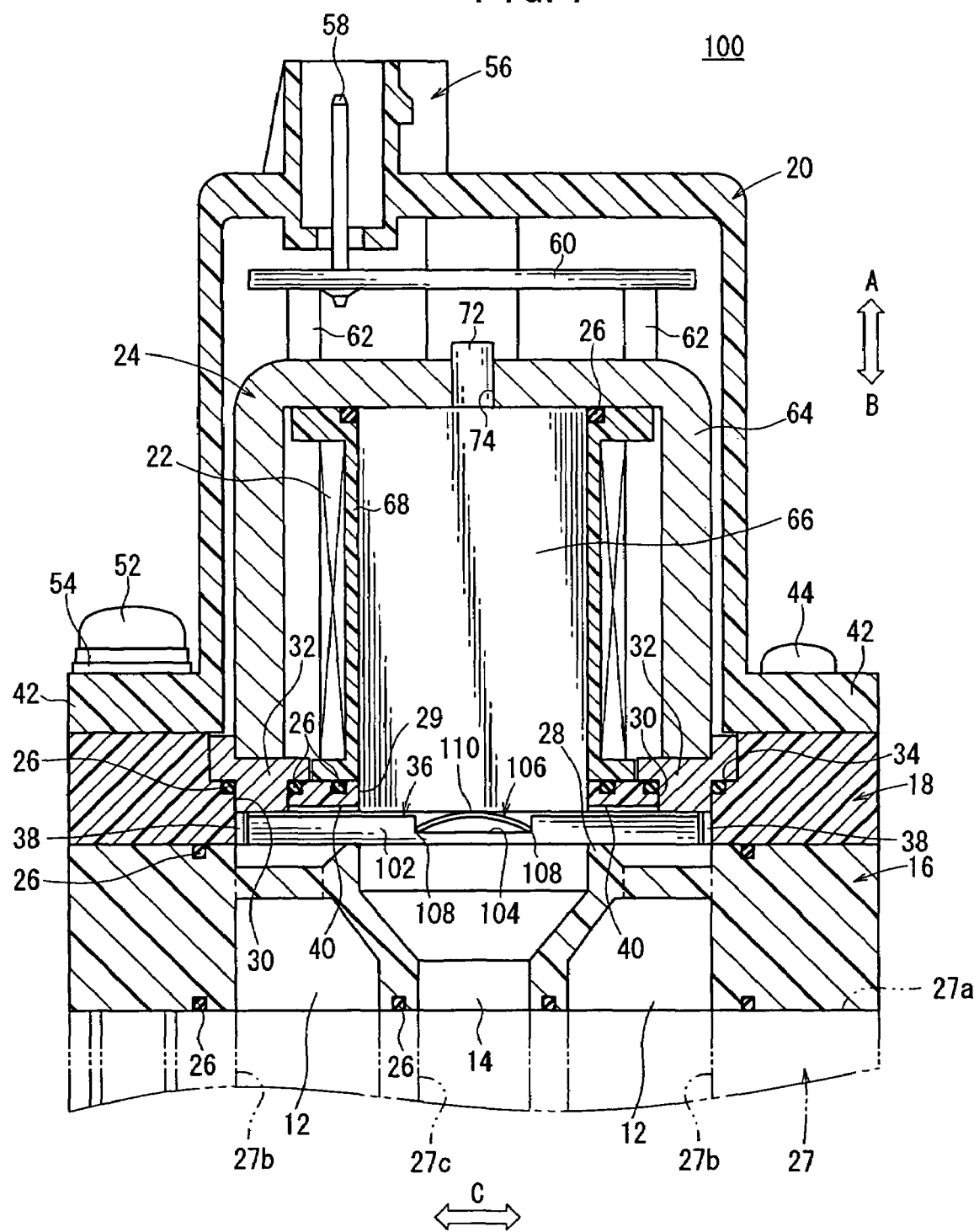
FIG. 7 is a vertical sectional view illustrating a solenoid-operated valve according to a second embodiment of the present invention.

Next, FIG. 7 shows a solenoid-operated valve 100 according to a second embodiment. The same constitutive components as those of the solenoid-operated valve 10 according to the first embodiment described above are designated by the same reference numerals, any detailed explanation of which will be omitted.

The solenoid-operated valve 100 according to the second embodiment is different from the solenoid-operated valve 10 according to the first embodiment in that a spring (resilient member) 106, which is convex toward the fixed iron core 66, is installed to an installation groove 104 formed on an end surface of a movable iron core 102 opposed to the fixed iron core 66, in place of the pair of springs 76 provided between the movable iron core 70 and the retaining members 32 in the first embodiment.

The spring 106 is formed of a plate member which is bent in an arc-shaped form and which has a constant thickness. The spring 106 is provided such that both ends thereof are engaged with corners 108 of the installation groove 104, and an apex 110 of the spring 106 always abuts against the other end of the fixed iron core 66.

When the solenoid-operated valve 100 is constructed as described above, then the movable iron core 102 is displaced toward the fixed iron core 66 against the resilient force of the spring 106 during the valve-opening operation in which the movable iron core 102 is separated from the valve seat section 28, and then the movable iron core 102 is retained at a position at which the displacing force of the movable iron core 102 is balanced with the resilient force of the spring 106. Therefore, a state is given, in which a slight clearance is formed between the movable iron core 102 and the fixed iron core 66. The movable iron core 102 does not make any contact with the fixed iron core 66 in the valve-open state. On the other hand, the movable iron core 70 is pressed by the resilient force of the spring 76 in the direction (direction of the arrow B) to make separation from the fixed iron core 66 during the valve-closing operation. Therefore, the movable iron core 102 can be quickly seated on the valve seat section 28.

Although certain preferred embodiments of the present invention have been shown and described in detail, it should be understood that various changes and modifications may be made therein without departing from the scope of the appended claims.

What is claimed is:

1. A solenoid-operated valve for switching a communication state and a non-communication state between one port and another port for allowing a pressure fluid to pass therethrough, by attracting a movable iron core under a magnetically exciting action of a coil, said solenoid-operated valve comprising:
   a body which has a communication chamber for introducing said pressure fluid supplied from said one port or said other port thereinto;
   said movable iron core which is provided displaceably in an axial direction in said communication and which is to be seated on a valve seat formed in said body;
   a fixed iron core which is provided at a position opposed to said movable iron core and to which a bobbin provided with said coil wound therearound is fixed, said fixed iron core comprising a solid body without an opening therethrough, said coil being wound around an outer periphery of said fixed iron core; and
   a resilient member which presses said movable iron core toward said valve seat, wherein said communication state between said one port and said other port is blocked by seating said movable iron core on said valve seat,
   wherein said resilient member produces a resilient force, which is capable of retaining a clearance forming an air gap having a predetermined distance between said movable iron core and said fixed iron core when said movable iron core is displaced in a direction toward said fixed iron core under said magnetically exciting action of said coil, and
   wherein said resilient member comprises:
   a flat section which is formed to be thin plate-shaped; and
   a pair of bent sections which protrude from said flat section on one side and which are bent permanently with respect to said flat section; and
   said bent sections abut against a surface of said movable iron core facing said fixed iron core,
   so that when said movable iron core is attracted away from said valve seat and is displaced toward said fixed iron core, said surface of said movable iron core facing said fixed iron core is in contact only with said bent sections of said resilient member, and said movable iron core does not come into contact with or abut against any portion of said fixed iron core, said bobbin or any other member intervening between said bobbin and said movable iron core, so that only said air gap is disposed between said fixed iron core and said movable iron core.

2. The solenoid-operated valve according to claim 1, wherein a communication groove, which is opposed to said movable iron core and which is communicated with said one port for supplying said pressure fluid thereto, is formed in said communication chamber, and said movable iron core is pressed toward said valve seat under a pressurizing action of said pressure fluid flowing through said communication groove.

3. The solenoid-operated valve according to claim 2, wherein a projection, which is expanded toward said movable iron core and which is disposed substantially in parallel to a direction of displacement of said movable iron core, is formed in said communication chamber, and displacement of said movable iron core in a direction substantially perpendicular to an axis of said body is limited by allowing said projection to abut against a side surface of said movable iron core.

4. The solenoid-operated valve according to claim 3, wherein at least one or more pairs of said projections are provided in said communication chamber, and said projections are arranged so that said projections are opposed to one another.

5. The solenoid-operated valve according to claim 1, wherein said movable iron core is formed to be thin plate-shaped in a direction of displacement of said movable iron core.

6. The solenoid-operated valve according to claim 1, wherein a projection, which is expanded toward said movable iron core and which is disposed substantially in parallel to a direction of displacement of said movable iron core, is formed in said communication chamber, and displacement of said movable iron core in a direction substantially perpendicular to an axis of said body is limited by allowing said projection to abut against a side surface of said movable iron core.

* * * * *